*INVENTORS*
ELLISON S. PURINGTON
EMORY LEON CHAFFEE
*BY* [signature]
ATTORNEY

PHASE SELECTIVE RECEIVER WITH FREQUENCY CONTROL

Filed Dec. 19, 1960 5 Sheets-Sheet 2

INVENTORS
ELLISON S. PURINGTON
EMORY LEON CHAFFEE
BY
ATTORNEY

INVENTORS
ELLISON S. PURINGTON
EMORY LEON CHAFFEE
BY
ATTORNEY

PHASE SELECTIVE RECEIVER WITH FREQUENCY CONTROL

INVENTORS
ELLISON S. PURINGTON
EMORY LEON CHAFFEE
BY
ATTORNEY

INVENTORS
ELLISON S. PURINGTON
EMORY LEON CHAFFEE
BY
ATTORNEY

United States Patent Office 3,381,224
Patented Apr. 30, 1968

3,381,224
PHASE SELECTIVE RECEIVER WITH FREQUENCY CONTROL

Ellison S. Purington, Gloucester, and Emory Leon Chaffee, Belmont, Mass., assignors to Ralph G. Lucas, Nathaniel L. Leek, and The National Shawmut Bank, executors of the estate of John Hays Hammond, Jr., deceased
Filed Dec. 19, 1960, Ser. No. 76,851
5 Claims. (Cl. 325—342)

This invention relates to radio-telegraphic communication and more particularly to improvements in a receiver for code signals sent by amplitude modulation of a carrier wave.

In previous patent applications Ser. No. 827,784 now U.S. Patent No. 3,339,143 and Ser. No. 40,639 we have disclosed a radio-telegraph communication system featuring a double-heterodyne receiver having phase selectivity as well as frequency selectivity. Specifically the receiver gives maximum audio output response when the incoming radio wave is of a certain phase. The receiver output expressed in equational form is $$\text{output}=KA \cos (\theta_0-\theta)$$

where K is the receiver constant, A is the amplitude of the radio signal wave impressed upon the receiver, $\theta_0$ is the phase of the signal wave best received, and $\theta$ is the actual phase of the impressed signal wave. Thus maximum output occurs when $(\theta_0-\theta)$ is 0° or 180°, but zero output obtains when the phase departure is 90° or 270°. Since for noise such as static, and for other interfering signals, the phase is in general statistically random, the phase selectivity feature of the double-heterodyne receiver gives the properly phased signal a considerable advantage over other signals and disturbances that can produce energy in the audio output circuits.

To maintain the receiver so that it always yields the maximum response for the desired signal, a phase lock system was provided in which the audio output circuits fed back an error signal to adjust the phase and frequency of one of the heterodynes. Furthermore, to provide that the error signal be properly developed at all times, both when the transmitter key is down and when it is up, we sent a "back" wave of the same frequency, but with phase 90° different from that of the key-down "front" wave. This back wave for the key-up condition produced no audio output signal response, since it was so phased that $\cos (\theta_0-\theta)$ was zero. Special circuitry provided that this back wave produced the same error signal as just previously had been produced by the front wave, so that there was no discontinuity in the production of the proper feedback error signal.

Now with heterodynes of sufficient and realizable stability as to frequency for use in VLF receivers, and with sufficiently long and realizable time constant for the error signal circuits, and also with new types of circuits for producing the error signal from the audio outputs of the heterodyne demodulators, we find it is possible to reduce the strength of the back wave to zero and yet obtain suitable phase lock operation from the audio responses from the front wave alone. Thus we have retained the phase selectivity advantages of the previous system, but have reduced the amount of transmitted power necessary to produce an audio output signal without change of signal-to-noise ratio, and have adapted the system to be responsive to keyed continuous-wave low-frequency type transmitters of the master-oscillator power-amplifier type already currently available and used. In short, we have provided a phase-selective receiver for conventional keyed AM transmitters which should yield a very worthwhile improvement as to signal-to-noise ratio over a conventional receiver of the single heterodyne type without phase selectivity, for the same conditions of transmitter power, antennas, and bandwidths. The receiver for this purpose is shown in the accompanying drawings, in which;

Like reference characters denote like parts in the several figures of the drawing.

In the following description parts will be identified by specific names for convenience, but they are intended to be generic in their application to similar parts.

Figure 1:
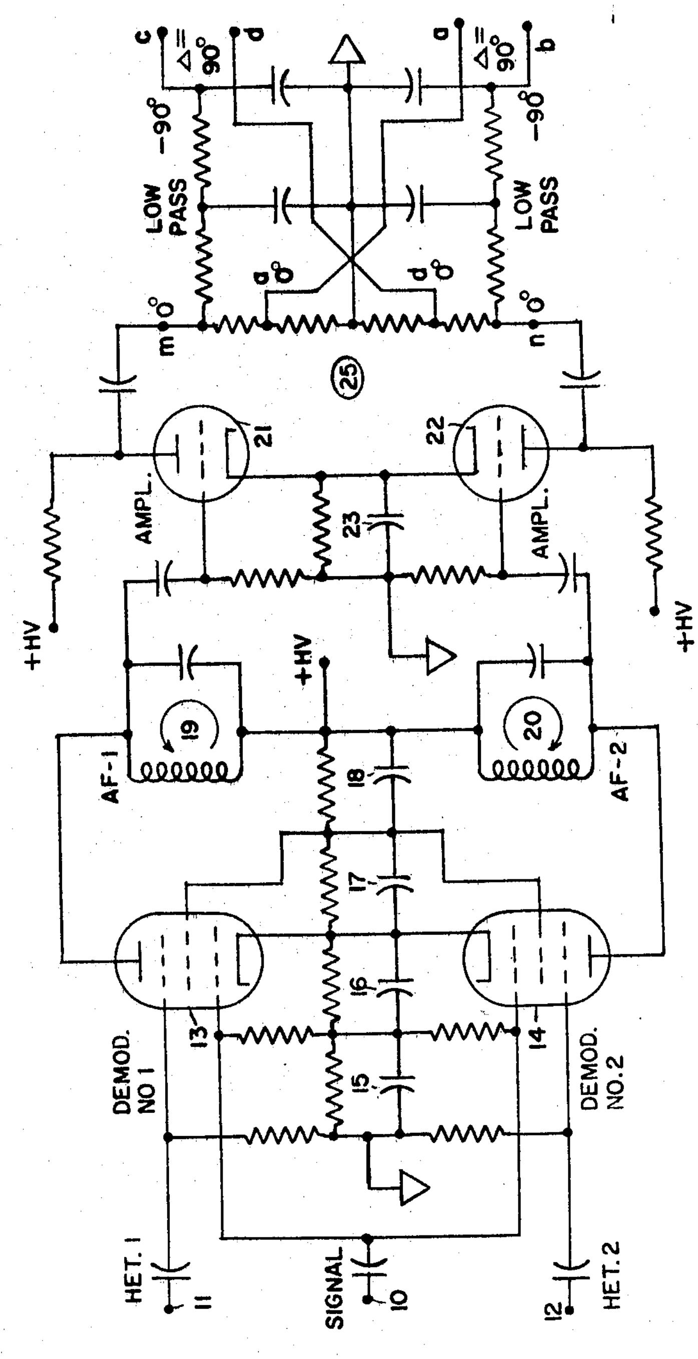
FIG. 1 is a diagram of the basic double-heterodyne receiver system.

In FIG. 1, the signal received from the transmitting station and amplified in earlier stages of the receiver, is applied between terminal 10 and ground. Continuous waves of frequencies higher and lower than the signal frequency by equal amounts are applied between terminals 11 and ground and 12 and ground. These are the heterodynes for the production from the signal of two audio-frequency outputs of the same frequency during receiver operation. The signal passes through a blocking capacitor to the first or control grids of two pentode demodulators 13 and 14, provided with suitable bias resistors and capacitors 15–18. The heterodyne sources are similarly arranged to drive the third or suppressor grids of the pentodes. Therefore, demodulator 13 produces output audio current from the signal and heterodyne 1, and demodulator 14 produces audio current from the signal and heterodyne 2. These two audio currents are of the same frequency during proper operation, and are similarly selectively tuned to by circuits 19 and 20. Preferably, as assumed in later discussions, the plates of the pentodes are of the same phase for normal operation, and adjustments are preferably made so that the magnitudes of the two audio outputs signals are equal for all frequencies.

The plates of pentodes 13 and 14 are coupled through capacitors to drive triode amplifiers 21 and 22, and the plates of these triodes are coupled through capacitors to points *m* and *n*. Points *m* and *n* are connected to the signal output amplifiers, shown in FIG. 6, for adding the audio voltages arising from the two heterodyne demodulators.

Points *m* and *n* are also connected to the input of a balanced distributor circuit 25 which feeds the phase-lock system. Circuit 25 consists of two low-pass RC filter sections providing 90° phase lag. Normally the input points *m* and *n* are of the same phase, indicated as zero degrees. The two output points *c* and *d* are, therefore, at −90° phase, while output points *a* and *d* are at zero degree phase. The voltages of points *a, b, c,* and *d* are made to be equal in magnitude by taps on resistors connecting points *m* and *n* to ground. Points *a, b, c,* and *d* are the input terminals of the circuits which produce the error signal used to control the phase of the heterodynes to be of proper relation to the phase of the input signal.

Figure 2:
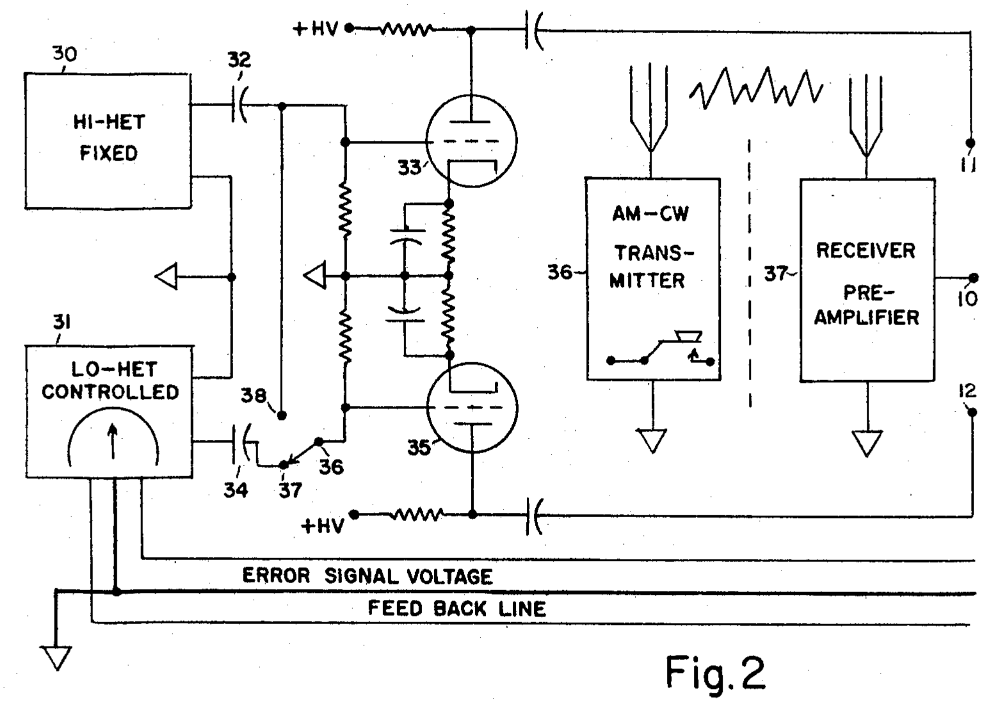
FIG. 2 is a diagram showing a preferred form of the input circuits for the system of FIG. 1.

Before describing the phase-lock system the input circuits of the receiver will be briefly described. Referring to FIG. 2 the two heterodynes are in blocks 30 and 31, the former being of fixed frequency and the latter being controllable as to frequency by a manual adjustment, as to phase-frequency by an error signal voltage supplied over a balanced feedback line from later parts of the receiver circuit. For purposes of demonstration and also of testing the balancing and equalization of receiver circuits, a switch 38 is provided so that normal single-frequency heterodyning may be used for both demodulator channels to provide the normal type of keyed continuous wave VLF telegraphic reception currently in use. Thus the heterodyne 30 is connected through capacitor 32 to the grid of an amplifier triode 33, while the heterodyne 31 is connected through capacitor 34 to the grid of amplifier triode 35 only when the switch is thrown to connect points 36 and 37. In this condition, the receiver as a whole has the new form with phase selective features; but with points 36 and 38 connected, the receiver as a whole has merely the features of a conventional receiver with mono-frequency heterodyning. That is, with the normal receiver, the signal output voltage has a magnitude that is independent of the phases of any waves which are within the acceptance band of the receiver circuits. The switch has been indicated to provide the dual frequency heterodyning which is the main feature of the invention, and in further discussions this condition of the switch will be assumed.

The outputs of triodes 33 and 35 are connected through capacitors to the terminals 11 and 12 which are also the terminals of the heterodyne inputs of FIG. 1. The figure also shows that the transmitter 36 is of the conventional keyed AM–CW type, customarily with the master-oscillator power-amplifier arrangement such that there is no loss of phase continuity during key operation. Additionally, the figure shows the receiving pre-amplifier circuit 37 of suitable gain and band width, which is connected to terminal 10 and to the input-signal terminal also numbered 10 in FIG. 1.

Figure 3:
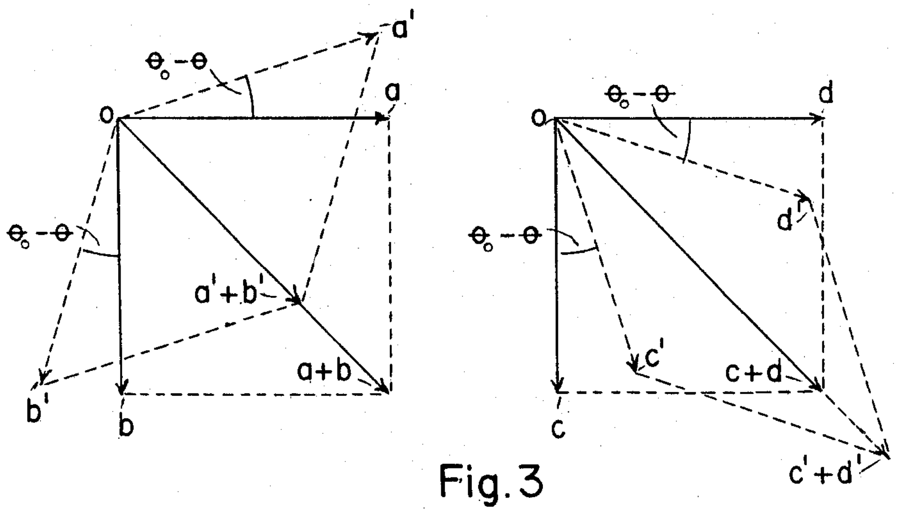
FIG. 3 is a set of vector diagrams explanatory of the operation of the phase correcting network.
Figure 4:
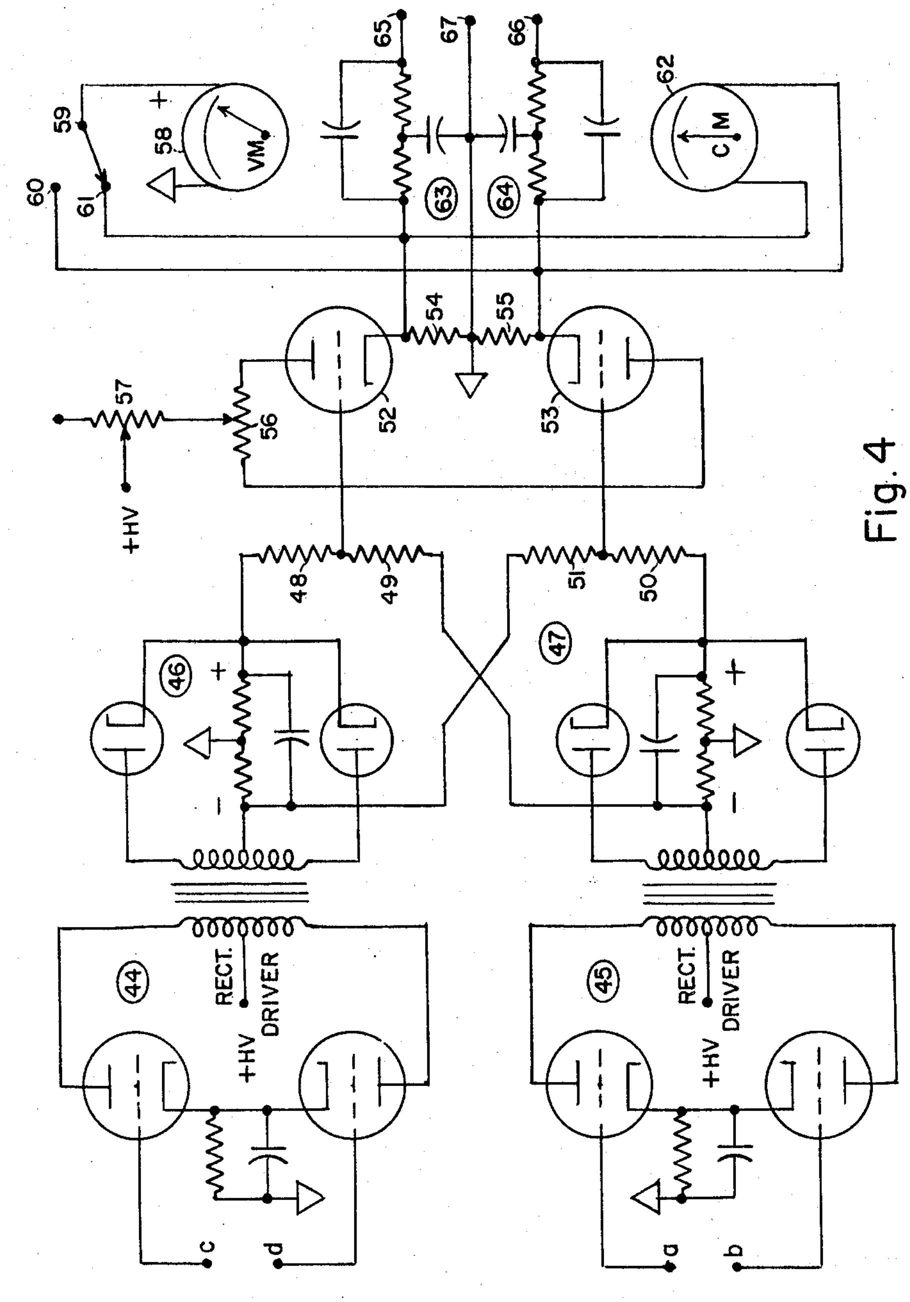
FIG. 4 is a diagram of the rectifier and error-signal feedback producing circuits.

The terminals *a*, *b*, *c*, and *d* of FIG. 1 are connected to similarly identified terminals in FIG. 4. The error signal arising when the phase relation between the signal wave and the heterodyne oscillations departs from that which produces a maximum audio signal is produced in the circuits of FIG. 4. The operation of these circuits depends upon the voltages between the input terminals *ab*, and *cd*. FIG. 3 is used to explain how these voltages change as the phase $\theta_0-\theta$ varies.

Assuming first that $\theta_0-\theta$ is zero, the condition for maximum audio signal. The voltages between points *m* to ground and *n* to ground are at zero phase. The voltages from point *a* to ground and from point *d* to ground are also at zero phase and are represented by vectors *a* and *d* of FIG. 3. Voltages from point *b* to ground and from point *c* to ground are represented by vectors *b* and *c*. The input voltages from *a* to *b* and from *c* to *d* are given by the vectors marked $a+b$ and $c+d$. These two voltages are the same in magnitude under the stated condition.

If now $\theta_0-\theta$ has a value different from zero vectors *a* and *d* shift in opposite directions as indicated by the new vectors $a'$ and $d'$. Vector *b* shifts by the same amount in the direction of the shift of vector *d*. Vector *b* becomes $b'$ and similarly vector *c* becomes $c'$. The voltage between points *c* and *d*, shown as vector $c'+d'$, is now greater than $c+d$, and voltage $a'+b'$ is less than $a+b$. If the phase departure $\theta_0-\theta$ were in the opposite direction voltage $c'+d'$ would be less than voltage $c+d$ and voltage $a'+b'$ would be greater than voltage $a+b$.

Referring to FIG. 4, the voltage between terminals *c* and *d* is amplified by the balanced amplifier 44, and rectified by the full-wave rectifier 46. Similarly the voltage between terminals *a* and *b* is amplified by balanced amplifier 45, and rectified by rectifiers 47. By a bridge arrangement including the outputs of the two rectifiers and the resistors 38, 49, 50, and 51, the voltage between the grids of cathode followers 52 and 53 and ground are zero when the phase $\theta_0-\theta$ is zero but vary in opposite directions when $\theta_0-\theta$ departs from zero.

A resistor 56 with movable center tap between the anodes of triodes 52 and 53 and a rheostat 57 from the center tap of 56 to the high voltage source, provide for exact equalization of the cathode output voltages for the condition of $\theta_0-\theta$ equal to zero. To assist in the adjustment, and to indicate the nature of the phase-lock operation, a voltmeter 58 may be provided, with a single pole double-throw switch with terminals 59, 60 and 61; and also a meter 62 with the needle at the center of the scale when the cathodes of the triodes 52 and 53 are at the same voltage from ground.

An RC network 63–64 is provided for coupling the cathodes of cathode followers 52 and 53 to the terminals 65, 66, 67, from which the balanced error signal is fed to the controllable heterodyne. The controllable heterodyne is constructed to provide suitable timing relations and signal attenuation to assure smooth operation of the frequency feedback control. The control must be such as to stabilize the system when the outputs of the two demodulators of FIG. 1 are in phase. Thus if the controlled oscillator 31 of FIG. 2 slows down and drifts toward a lower frequency, point *n* of FIG. 1 will lag behind *m*, making the difference of phases of the inputs to drivers 44 and 45 of FIG. 4 such that rectifier 46 produces less rectified output than rectifier 47. This causes the grid of triode 52 to be negative and the grid of triode 53 to be positive with respect to ground preferably the meter 62 should be so connected that in the above condition, the needle will be at the left of center, indicating that the controlled heterodyne is too low in frequency, and that a suitable control voltage, with terminal 65 lower in voltage than terminal 66 with respect to ground terminal 67, has been developed to speed up the controlled heterodyne and increase its frequency.

Figure 5:
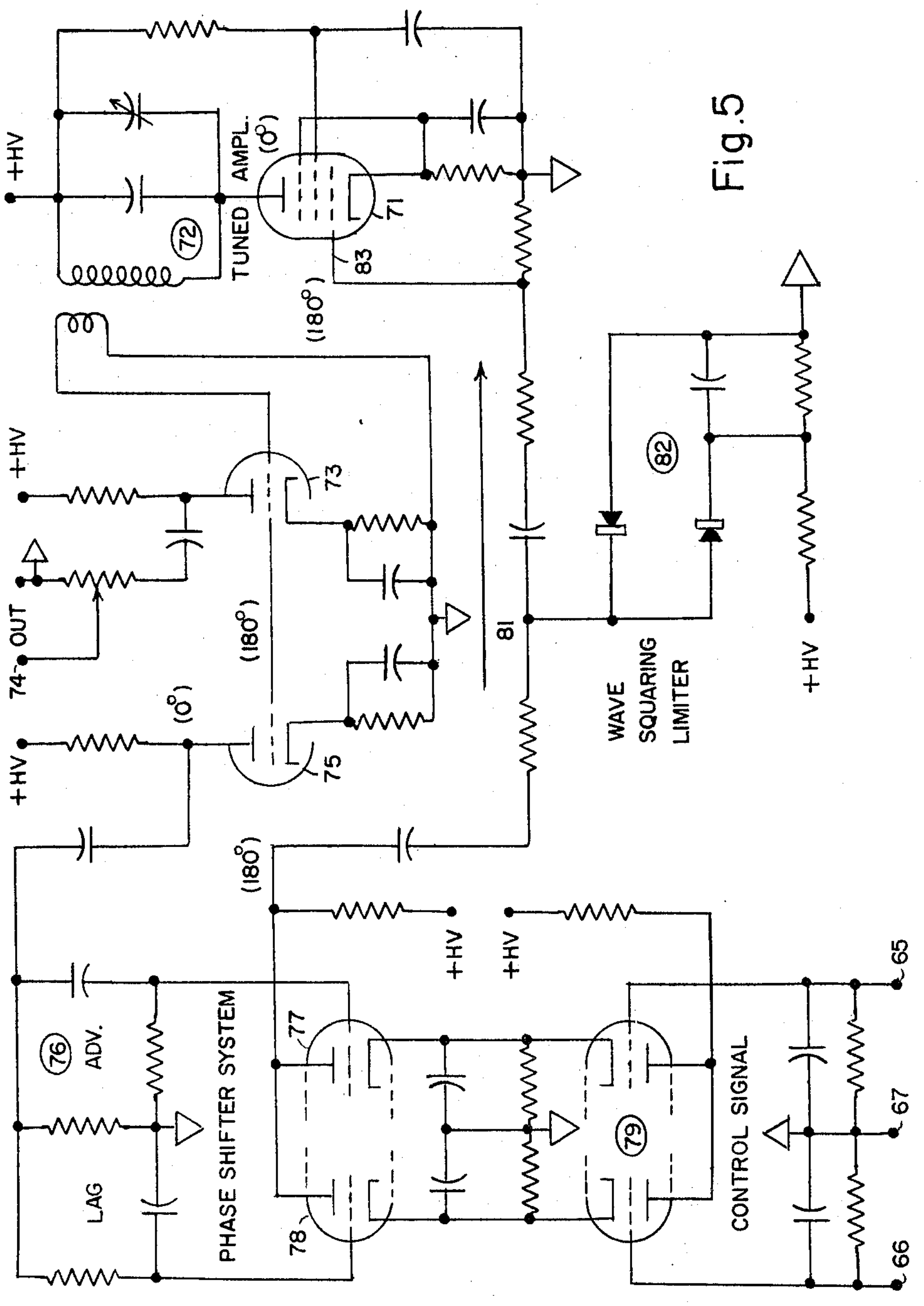
FIG. 5 is a diagram of a heterodyne oscillator circuit controllable as to phase and frequency by the error signal produced by the circuits of FIG. 4

FIG. 5 shows one form of frequency-controlled heterodyne useful for the purpose. It is based upon the principal that for any oscillator, the sum of the phase changes around the loop from any point to the same point must be an integral number times 360°, or else the frequency would be changing. If, purposely, the phase is shifted in one section of the loop, then oscillations will persist if the frequency changes to cause a compensatory shift in another part of the loop. In the figure, 71 is a pentode amplifier, with a tuned circuit 72, including a variable member such as a variable capacitor. The phase portion of the transfer function from grid to plate is dependent upon the frequency. Specifically, an increase of frequency impressed upon the amplifier causes a greater phase lag, and a decrease produces lesser phase lag. For exact resonance, with single circuit output as indicated, there is substantially 180° change of voltage from control grid to the plate of the pentode. The output of the pentode drives triode 73 to produce the heterodyne output at terminal 74. It also drives triode 75 through which the signal from the plate of the pentode passes on its loop path back to the grid of the pentode. The output of triode 75 feeds a phase-shifting circuit 76, whereby the voltages to the grids of triodes 77 and 78 are phase advanced and phase retarded, respectively, with respect to the voltage of the plate of triode 75. The amplifications of these triodes 77 and 78 are varied in accordance with the magnitudes and senses of the error signals impressed from the output of FIG. 4 upon the input terminals 65, 66, and 67 of FIG. 5. This is accomplished by the use of cathode follower triodes 79 with the cathode coupled to the triodes 77 and 78. Therefore, the common output voltage of triodes 77 and 78 can be made to advance or retard in phase depending upon whether triode 77 or 78 is biased for the greater amplification. The output of triodes 77 and 78 is fed through a resistor and a capacitor to a junction point 81 where it is wave shaped to a substantially square wave form by the limiting circuits 82. The limited voltage form at point 81 is then fed through a capacitor and voltage divider circuit to the grid 83 of pentode 71, the coupling from the circuit 72 to the grid of triode 75 is such that phase reversal results. Thus normally, assuming 180° phase shift from grid to plate of each amplifier in the chain, and starting with zero reference phase at the plate of the pentode 71, the phases of the fundamental frequency of the system at various points are as indicated in parentheses. But suppose the frequency of oscillation of the system decreases, so that a phase lag develops at the output 74 of the heterodyne. In the receiver, it has been shown that a lag of the controlled heterodyne causes terminal 65 of FIGS. 4 and 5 to be lowered in voltage and terminal 66 to be increased in voltage, with respect to ground terminal 67. By following through the coupling system from the terminals 65, 66, and 67 to the cathodes of the triodes 77 and 78 of FIG. 5, it is found that the triode 77 amplifies better than triode 78, to advance the phase of the common plate output and the phase of the signal to the grid of the pentode 71. Oscillations will then be produced at a frequency such that the phase changed from grid to plate of the pentode is less than 180°. Thus if the phase of the grid voltage becomes 185° instead of the normal 180° and the phase of the plate of the pentode is to remain fixed at the reference 0°, then the phase change from grid to plate of the pentode must become 175°. Since the normal shift is 180°, and increase of frequency causes a phase lag, the frequency of the system increases to compensate for the lowered frequency which caused input terminals 65 and 66 to be lowered and raised in voltage, respectively. It should be noted that the correction may be required for other reasons than drift of the controlled oscillator. Thus the frequencies of the radio signal or the fixed heterodyne may be changing. These changes will be compensated for by change of the controlled heterodyne in such a manner as to tend to keep terminals 65 and 66 at the same voltage and therefore the terminals *m* and *n* of FIG. 1 at the same audio phase.

It is to be understood that the other but fixed heterodyne 30 of FIG. 2 is of conventional construction, such as crystal controlled or any other suitable type, and needs no detailed description.

Figure 6:
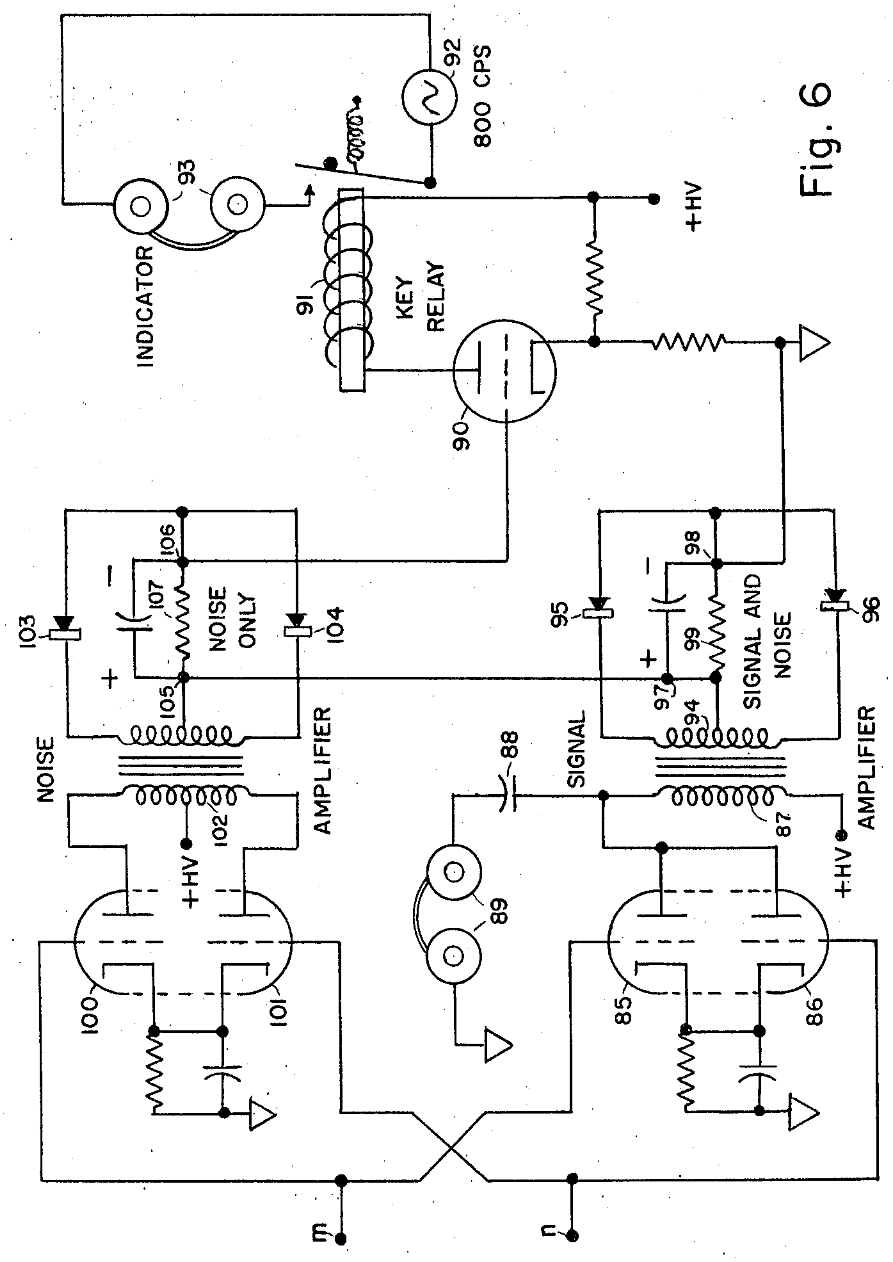
FIG. 6 is a diagram of a form af audio-signal output systems usable with the present receiver.

The figures thus far show how the audio-frequency outputs at points *m* and *n* of FIG. 1 are made to be in phase and substantially equal for the key-down position of the transmitter of FIG. 2. FIG. 6 shows one of many possible forms of combining and indicating circuits which might be driven from terminals *m* and *n* in accordance with the present invention. It is mainly necessary to combine the two signals additively. When this is done, the effects of interferences in the audio circuits in general will be reduced since noises are not necessarily of phases for best additive effects at the terminals *m* and *n*.

In FIG. 6, the input terminals *m* and *n* are connected to the grids of two amplifiers 85 and 86, the plates of which are connected together and through the primary winding 87 of a transformer to the HV source. These plates are also connected through a coupling capacitor 88 to headphones 89. Here the audio signals are additive for proper indication. But it is realized that there are also noise disturbances in the audio inputs at *m* and *n*, although when the double heterodyne system is in use, there is no frequency relation amongst the disturbances. That is, although the signals are coherent and can add properly for maximum effect, the noises may not so add. For further improvement of the audio circuits, we provide for further minimizing of the noises with respect to the signal by use of a key tube 90 with output relay 91 to control the connection of a local oscillator source 92 to a final indicator such as headphones 93. Furthermore, we provide compensation such that the operating voltage for the grid circuit of the key tube 90 is mainly due to the signal, and to a reduced degree due to the noise. For this purpose, the transformer with single primary winding 87 is chosen with a push-pull output winding 94 which drives rectifiers 95 and 96 to produce a rectified output between terminals 97 and 98 of a resistor 99, with the negative terminal 98 connected to ground and terminal 97 positive with respect to ground. Thus a bias voltage for triode 90 is provided, of magnitude corresponding to the signal and the noise since noise cannot be directly separated from the signal. Additionally we provide a noise amplifier using triodes 100 and 101, the grids of which are connected to the input terminals *m* and *n*, respectively, But the output transformer primary 102 is of the push-pull type which delivers voltage to the secondary from the components of the inputs that are out of phase. Therefore this noise amplifier does not deliver output to the secondary due to the signals, which are in phase at the inputs, but delivers output only from the noises present. The secondary of the transformer of the noise amplifier also drives a recifier system with rectifiers 103 and 104 to create a rectified output with terminal 105 positive and 106 negative at the ends of the output resistor 107. The rectified voltage corresponds to the noise only. It is to be noted we may if desired use curve shaping circuits using diodes and resistors in well known arrangements, so that more desirable relations between the transformer voltages and resulting bias voltages may be achieved, for both rectifier systems. And we may insert additional amplifiers for example in the noise circuit, as may be desirable. Finally, we connect the output resistors of the two rectifier systems in series so that the current through resistor 99 tends to reduce the bias of tube 90 and increase the current through the relay 91, while the current through resistor 107 tends to increase the bias and reduce the relay current. In this manner the net bias on the key tube can be made to correspond more closely to what it would have been if there had been no noise present.

Although only a few of the various forms in which this invention may be embodied have been shown herein, it is to be understood that the invention is not limited to any specific construction but may be embodied in various forms without departing from the spirit of the invention.

What is claimed is:

1. A phase sensitive receiver for interrupted continuous wave transmission comprising tuned circuit means adapted to receive a continuous wave carrier, a pair of local oscillators adapted to produce oscillations having frequencies respectively above and below the frequency of said carrier and differing therefrom by equal amounts, circuit means connected to modulate said carrier with oscillations from the respective local oscillators to derive therefrom a pair of beat frequencies which are identical in frequency and are in phase when said carrier has a predetermined phase relationship, means including a resistance-capacitance network connected to respond to said beat frequencies and having output means adapted to produce a pair of output voltages which are of equal value when said beat frequencies are in phase and differ in value in one direction or other when said beat frequencies are out of phase, one of said local oscillators including a control circuit responsive to variations in voltage to control the frequency of said oscillator, and means supplying said last output voltages to said control circuit in a sense to control the frequency of said last oscillator so as to maintain said beat frequencies in phase.

2. A phase sensitive receiver for interrupted continuous wave transmission comprising tuned circuit means adapted to receive a continuous wave carrier, a pair of local oscillators adapted to produce oscillations having frequencies respectively above and below the frequency of said carrier and differing therefrom by equal amounts, circuit means connected to modulate said carrier with oscillations from the respective local oscillators to derive therefrom a pair of beat frequencies which are identical in frequency and are in phase when said carrier has a predetermined phase relationship, circuit means responsive to the sum of the components of said beat frequencies to derive therefrom a voltage representing the signal and noise components of the received energy, additional circuit means responsive to the difference of said beat frequencies to produce therefrom a voltage representing the noise components only of the received energy, means rectifying said sum and difference voltages to produce two unidirectional voltages one dependent upon the signal and noise and the other upon noise only, means deriving a voltage corresponding to the difference between said last voltages which represents the signal value only, means to apply such last voltage to produce signal.

3. A receiver as set forth in claim 2 wherein said second circuit means includes amplifier means connected to respond to the additive effect of said beat frequencies and said third circuit means includes a push-pull amplifier connnected to respond only to the differential effect of said beat frequencies.

4. In a receiver as set forth in claim 2 circuit means connected to derive an error signal when said beat frequencies become out of phase and means connecting said error signal to apply a control voltage to one of said local oscillators in a sense to vary the frequency thereof so as to maintain said beat frequencies in in-phase relationship.

5. In a receiver as set forth in claim 2 means including a network connected to receive said beat frequencies and to derive therefrom a pair of voltages which are equal when said beat frequencies are in phased and which become unequal when said beat frequencies are out of phase and means connecting said last voltages to control the frequency of one of said local oscillators in a sense to restore said beat frequencies to in-phase relationship.

References Cited

UNITED STATES PATENTS

| | | | |
|---|---|---|---|
| 2,425,981 | 8/1947 | Bard et al. | 331—31 |
| 2,770,727 | 11/1956 | Hupert et al. | 250—20.36 |
| 2,813,974 | 11/1957 | Keall | 250—20.35 |
| 2,715,677 | 8/1955 | Turner | 250—20.36 |
| 2,955,199 | 10/1960 | Mindes | 250—20.36 |

FOREIGN PATENTS

| | | |
|---|---|---|
| 669,113 | 3/1952 | Great Britain. |

ROBERT L. GRIFFIN, *Primary Examiner.*

SAMUEL B. PRITCHARD, *Examiner.*

W. S. FROMMER, J. R. GAFFEY, *Assistant Examiners.*